Patented Dec. 10, 1929

1,739,306

UNITED STATES PATENT OFFICE

HARRY N. HOLMES, OF OBERLIN, OHIO

IMPREGNATION OF POROUS GELS WITH METALS OR OTHER INSOLUBLE MATERIAL

No Drawing.  Application filed August 13, 1927. Serial No. 212,828.

This invention relates to a method of uniformly depositing metals or other insoluble materials in the microscopic or ultra-microscopic pores of porous solid materials.

The object of the invention is to provide an improved method which insures penetration of the depositing materials to the innermost pores or cavities and a homogeneous deposition throughout the lump or mass of porous solid material, with a product supplying an increased surface of deposited material per unit of weight of the same, thereby increasing efficiency.

The broad invention forms the subject matter of my co-pending application for impregnation of porous gels with solid material, filed of even date herewith, Ser. No. 212,829, to which reference may be had, and contemplates the deposition of any solid material in a porous gel by the reaction between two substances which under certain conditions do not react with each other and under other conditions do react with each other, by first distributing the two substances through the pores under the first conditions and then producing the second conditions to produce and promote reaction and deposition. The present invention relates more particularly to the deposition of metals or to a depositing reaction which is caused by a change in temperature.

The invention takes advantage of the possibility of restraining, retarding or even inhibiting reaction between two materials at one temperature, say a low temperature, whereas their subjection to another temperature, say a higher temperature, speeds or causes reaction, with the deposition of some solid material which is useful when deposited in the cavities or pores of these solid materials.

For example, at about 100° C. more or less, a formalin solution will form metallic platinum from a slightly basic solution of chloroplatinic acid, while at room temperature or lower the rate of reaction is not appreciable or at least is so slow that thorough diffusion of the reagents through the porous solid may be secured before sufficient reaction and deposition has occurred to block or choke the outer pores and interfere with penetration and diffusion. In this way salts of platinum, palladium, etc., may be reduced to the metal, especially in the presence of formalin.

The porous solid may be of any suitable form, such as is used as a carrier for catalytic material and, for example, may be a porous solid gel provided with either or both of microscopic or ultra-microscopic pores, such as the silica gel described in my prior application Ser. No. 56,077, filed September 12, 1925, or in the application filed jointly by myself and John A. Anderson, Ser. No. 656,716, filed August 10, 1923. Such a silica gel is crushed or otherwise reduced to fragments of suitable size, say to half the size of a grain of wheat. A proper quantity of such silica gel is soaked in a solution prepared by dissolving one gr. of crystalline chloroplatinic acid in a convenient volume of water, adding enough dilute sodium hydroxide solution to make the solution slightly basic and then adding a little more sodium hydroxide to give a slight excess of the base. Enough water is added to make the total volume 40 cc. and this solution is used to moisten, say 72 cc. gross volume of the crushed or broken porous silica gel referred to. This porous solid will take up practically all of the liquid solution, with a quick penetration or diffusion thereof into the innermost pores or cavities. The gel is now dried carefully at about 100° C. to remove water, care being taken not to raise the temperature so high as to cause possible harmful effect either upon the dry deposit of chloroplatinic acid in the pores or upon the structure of the gel itself. The dried solid is now moistened with formalin solution but is not immersed in it. In other words, formalin solution is added carefully at about the rate at which it is taken up by the porous solid, thereby preventing washing out of the valuable platinum salt with the formalin. At room temperature or even lower there is no appreciable reaction between the formalin and the platinum salt, but upon increase in temperature up to approximately 100° C. the reaction is prompt and rapid. Some temperature range is permissible. At this higher temperature the platinum salt is reduced to metallic platinum, which is left deposited in all the pores and cavities of the gel. The product is dried carefully and may be washed repeatedly to a sufficient extent to remove soluble salts or other soluble material, if desired.

By this means a greater free surface of platinum per gram of the metal is obtained than by previous methods, which materially reduces the cost where expensive metal like platinum is used. The product at lower cost is superior to prior products for catalyzing the reaction between sulfur dioxide and oxygen with the formation of sulfur trioxide.

In the reduction of palladium salts to metal by formaldehyde in a similar manner, it is necessary to start with palladous chloride instead of palladic chloride and the presence of a base is unnecessary.

Metallic silver may also be deposited in the pores of porous solids by mixing together, at a temperature well below room temperature, solutions of silver nitrate, ammonia added in just sufficient amount to re-dissolve any precipitate first formed, and formaldehyde. The gel is soaked in this solution at once and is immediately heated to approximately 100°. At the lower temperature reaction is not appreciable and at the higher temperature deposition of silver takes place promptly and rapidly.

The invention may also be utilized for the deposition of other substances than the metals in cases where reaction between the two reacting solutions is retarded or practically inhibited at one temperature and is speeded at a higher temperature.

What I claim is:

1. The method of impregnating a dry rigid-walled porous gel containing microscopic and ultra-microscopic pores with catalytic material, consisting in causing diffusion through substantially all of the pores of the rigid gel of a mixture of solutions capable of reacting to form catalytic material but incapable of changing or attacking the gel structure and at a temperature at which reaction between them is not appreciable, and then subjecting the gel with its pores substantially filled with said mixture to a temperature at which appreciable reaction occurs, thereby producing upon the unchanged walls of substantially all of the pores a deposit of the desired catalytic material.

2. The method of impregnating a dry rigid-walled porous gel containing microscopic and ultra-microscopic pores with catalytic material, consisting in causing diffusion through substantially all of the pores of the rigid gel of a solution of one substance, causing diffusion through the pores of the gel of a second solution capable of reacting with the first solution to produce catalytic material but incapable of changing or attacking the gel structure and at a temperature at which reaction between the two solutions will not occur, and then subjecting the porous gels to a temperature at which reaction occurs, thereby depositing catalytic material within substantially all of the pores of the gel.

3. The method of impregnating a dry rigid-walled porous gel containing microscopic and ultra-microscopic pores with catalytic metal, consisting in distributing through substantially all of the pores of the gel a solution containing a soluble compound of the metal in the presence of a reducing agent, said compound and agent being incapable of changing or attacking the gel structure and being distributed at a temperature at which reduction to the metal is not appreciable, and then subjecting the porous solid to a temperature at which the metallic compound is reduced and the catalytic metal is deposited in substantially all of the pores of the gel.

In testimony whereof I hereby affix my signature.

HARRY N. HOLMES.